(12) United States Patent
DeMeritt et al.

(10) Patent No.: US 9,435,917 B2
(45) Date of Patent: Sep. 6, 2016

(54) LASER-PROCESSED GRIN LENSES AND OPTICAL INTERFACE DEVICES AND ASSEMBLIES USING SAME

(75) Inventors: Jeffery Alan DeMeritt, Painted Post, NY (US); Davide Domenico Fortusini, Ithaca, NY (US); Pushkar Tandon, Painted Post, NY (US)

(73) Assignee: Corning Incorporated, Corning, NY (US)

(*) Notice: Subject to any disclaimer, the term of this patent is extended or adjusted under 35 U.S.C. 154(b) by 666 days.

(21) Appl. No.: 13/495,073

(22) Filed: Jun. 13, 2012

(65) Prior Publication Data

US 2012/0321249 A1  Dec. 20, 2012

Related U.S. Application Data

(60) Provisional application No. 61/497,177, filed on Jun. 15, 2011.

(51) Int. Cl.
*G02B 6/32* (2006.01)
*G02B 3/00* (2006.01)
*G02B 6/42* (2006.01)

(52) U.S. Cl.
CPC ............... *G02B 3/0087* (2013.01); *G02B 6/32* (2013.01); *G02B 6/4206* (2013.01); *G02B 6/4214* (2013.01)

(58) Field of Classification Search
CPC ....... G02B 6/32; G02B 6/262; G02B 6/2552
See application file for complete search history.

(56) References Cited

U.S. PATENT DOCUMENTS

| | | | |
|---|---|---|---|
| 6,693,687 B2 | 2/2004 | Ohta | |
| 6,862,384 B2 | 3/2005 | Koshi et al. | |
| 6,951,425 B2 | 10/2005 | Vergeest | |
| 6,963,682 B2 | 11/2005 | Bhagavatula et al. | |
| 7,043,126 B2 | 5/2006 | Guan et al. | |
| 7,142,741 B2 | 11/2006 | Osborne | |
| 7,377,700 B2 | 5/2008 | Manning | |

(Continued)

FOREIGN PATENT DOCUMENTS

| | | |
|---|---|---|
| CN | 1359016 | 7/2002 |
| CN | 1650207 | 8/2005 |

(Continued)

OTHER PUBLICATIONS

CN201280029251.1 Search Report.

(Continued)

*Primary Examiner* — Sung Pak
*Assistant Examiner* — Hoang Tran
(74) *Attorney, Agent, or Firm* — Robert L. Carlson

(57) ABSTRACT

Laser-processed gradient-index (GRIN) lenses and optical interface devices and assemblies that utilize the laser-processed GRIN lenses are disclosed. A GRIN lens assembly includes a cylindrical central section having a GRIN index profile, planar front and back surfaces, an outer surface, and a diameter $D_1$ where 200 micrometers$\leq D_1 \leq$420 micrometers. An annular cladding of outer diameter $D_2$ surrounds the central section outer surface and has front and back annular surfaces and a constant or a varying refractive index. One or both of the front and back annular surfaces may be curved. An optical fiber is optically coupled to the central section at the planar back surface. An optical interface device is formed by operably supporting at least one GRIN lens assembly with a support member. An optical interface assembly is formed by interfacing two optical interface devices.

19 Claims, 17 Drawing Sheets

(56) References Cited

U.S. PATENT DOCUMENTS

| | | |
|---|---|---|
| 2002/0005051 A1* | 1/2002 | Brown et al. .................... 65/414 |
| 2002/0078806 A1 | 6/2002 | Koshi |
| 2002/0150333 A1 | 10/2002 | Reed et al. |
| 2003/0165290 A1* | 9/2003 | Bhagavatula et al. .......... 385/33 |
| 2004/0057664 A1 | 3/2004 | Bolle |
| 2005/0008310 A1* | 1/2005 | Ohta et al. .................... 385/123 |
| 2005/0069257 A1* | 3/2005 | Bhagavatula et al. .......... 385/33 |
| 2005/0220401 A1 | 10/2005 | Jiang et al. |
| 2010/0331626 A1* | 12/2010 | Shimotsu ...................... 600/182 |

FOREIGN PATENT DOCUMENTS

| | | | |
|---|---|---|---|
| CN | 1677146 | 10/2005 | |
| CN | 1945364 | 4/2007 | |
| JP | 2007034046 | 2/2007 | |
| WO | WO2010/118106 | * 10/2010 | ............. C03B 37/16 |

OTHER PUBLICATIONS

International Search Report and Written Opinion of the International Searching Authority; PCT/US2012/041814; Mailed Jan. 9, 2013.

Ammer et al; "Novel Small Form Factor Optical Ribbon Fiber Connector for Singlemode Applications"; Proceedings of IEEE/LEOS Workshop on Fibres and Optical Passive Components, Jun. 22-24, 2005, pp. 339-344.

\* cited by examiner

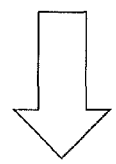

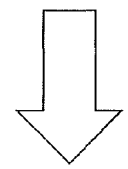

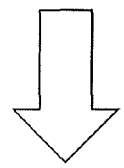

LASER-PROCESSED GRIN LENSES AND OPTICAL INTERFACE DEVICES AND ASSEMBLIES USING SAME

CROSS-REFERENCE TO RELATED APPLICATIONS

This application claims the benefit of priority under 35 U.S.C. §119 of U.S. Provisional Application Ser. No. 61/497,177 filed on Jun. 15, 2011, the content of which is relied upon and incorporated herein by reference in its entirety.

FIELD

The present disclosure relates generally to gradient-index (GRIN) lenses, and in particular to GRIN lenses formed by laser processing, and optical interface devices and optical interface assemblies that utilize the laser-processed GRIN lenses.

BACKGROUND

Optical fiber is increasingly being used for a variety of applications including, but not limited to, broadband voice, video, data transmission and consumer electronic devices configured with optical communication capability. As such, consumer devices require increasing amounts of bandwidth, and therefore optical interface devices (also referred to more colloquially as "optical connectors") are likely to see increasing use. However, generally speaking, conventional optical interface devices were originally developed as specialized fiber optic connectors for telecommunication networks. Such optical interface devices are thus unsuitable for the more general and robust requirements associated with consumer electronic devices that have optical communication capability. Conventional optical interface devices rely most often on the direct alignment of one optical fiber core to another. For the robust requirements associated with consumer electronic devices, there are certain advantages to incorporating lenses that effectively expand the diameter of the coupled light beam.

Certain types of optical interface devices developed to date employ one or more lenses supported within one or more ferrules so that the lens surfaces that have a curvature are not exposed to the external environment. In addition, the external lens surfaces (i.e., the surfaces exposed to the external environment) are typically flat, and in some cases are configured to make substantial solid-to-solid contact with the external lens surfaces of a mating optical interface device in forming an optical interface assembly. Such contact serves to expel liquid contaminants from the assembly interface to maintain a satisfactory optical connection.

Certain types of lens-based optical interface devices utilize one or more GRIN lenses. The GRIN lenses of the optical connectors can be arranged in a ferrule or other support member and then laser processed (i.e., laser cleaved) to achieve a final GRIN lens configuration. However, such laser processing can have a detrimental effect on the performance of the GRIN lens in an unpredictable and uncontrolled way, particularly with respect to the shape of the external lens surfaces. This in turn leads to a reduction in coupling efficiency and an increase of cross-talk between channels when the optical interface devices are mated to form an optical interface assembly.

SUMMARY

An aspect of the disclosure is a GRIN lens assembly that includes a cylindrical central section having a polynomial or parabolic GRIN index profile, planar front and back surfaces, an outer surface, and a diameter $D_1$ in the range of 200 micrometers $\leq D_1 \leq$ 420 micrometers. The GRIN lens assembly also includes an annular cladding of outer diameter $D_2$ surrounding the central section outer surface and having front and back annular surfaces and either a constant or a varying refractive index. The GRIN lens assembly further includes an optical fiber optically coupled to the central section at the planar back surface.

Another aspect of the disclosure is an optical interface device for transmitting light having a wavelength. The optical interface device includes at least one GRIN lens element as described above. The optical interface device also includes a support member configured to operably support the at least one GRIN lens element within a front chamber, the support member operably supporting at least one optical pathway that includes the at least one GRIN lens element.

Another aspect of the disclosure is an optical interface assembly that includes first and second optical interface devices interfaced so that their respective GRIN lens planar front surfaces are confronting and spaced apart by a distance d in the range of 0 micrometers $\leq d \leq$ 200 micrometers.

Another aspect of the disclosure is a method of forming a GRIN lens, where the method includes drawing a cylindrical GRIN cane having a polynomial or parabolic GRIN index profile to form a cylindrical GRIN rod defining a central section with an outer surface, the central section having a diameter $D_1$ in the range of 200 micrometers $\leq D_1 \leq$ 420 micrometers. The method also includes cladding the cylindrical GRIN rod outer surface with an annular cladding having an annular width $\delta r$ in the range of 5 micrometers $\leq \delta r \leq$ 50 micrometers. The method also includes laser cleaving the coated cylindrical GRIN rod to form a GRIN lens element, wherein the central section has a front planar surface defined by the laser cleaving and the annular cladding has a curved annular front surface also defined by the laser cleaving.

Another aspect of the disclosure is a GRIN lens assembly that includes a monolithic transparent medium and at least one GRIN lens supported in the monolithic transparent medium.

It is to be understood that both the foregoing general description and the following detailed description present embodiments of the disclosure, and are intended to provide an overview or framework for understanding the nature and character of the disclosure as it is claimed. The accompanying drawings are included to provide a further understanding of the disclosure, and are incorporated into and constitute part of this specification. The drawings illustrate various exemplary embodiments of the disclosure, and together with the description serve to explain the principles and operations of the disclosure. The claims are incorporated into and constitute part of this specification.

DETAILED DESCRIPTION

Figure 1:
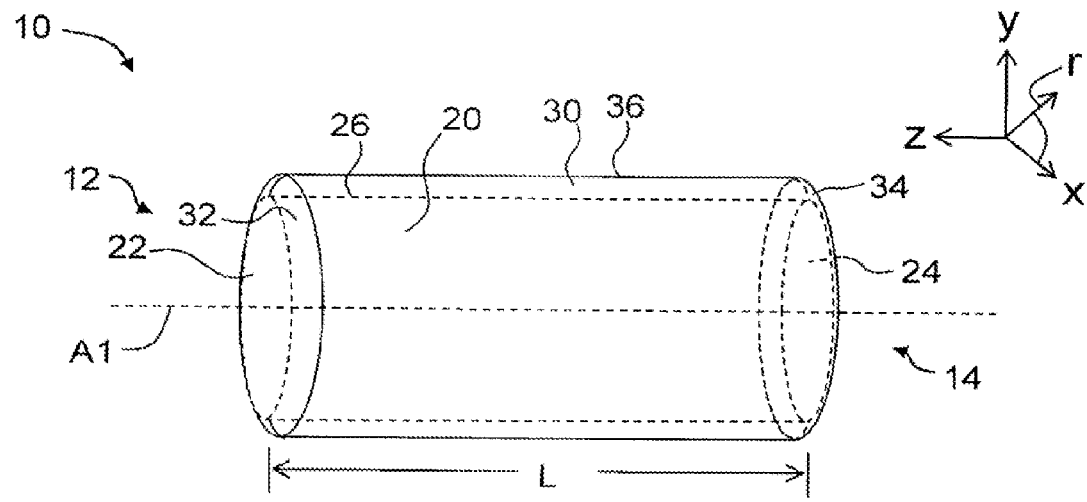
FIG. 1 is an elevated view of an example GRIN lens according to the disclosure.

Reference is now made in detail to the embodiments of the disclosure, examples of which are illustrated in the accompanying drawings. Whenever possible, like or similar reference numerals are used throughout the drawings to refer to like or similar parts. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure, in view of but not limited to the embodiments described herein. Cartesian coordinates are shown in some of the Figures for the sake of reference and for viewing the Figures, and not by way of limitations as to particular orientations or directions.

The word "light" as used is herein is synonymous with the term "optical radiation" and can mean visible optical radiation as well as invisible optical radiation, for example infrared optical radiation.

Figure 2:
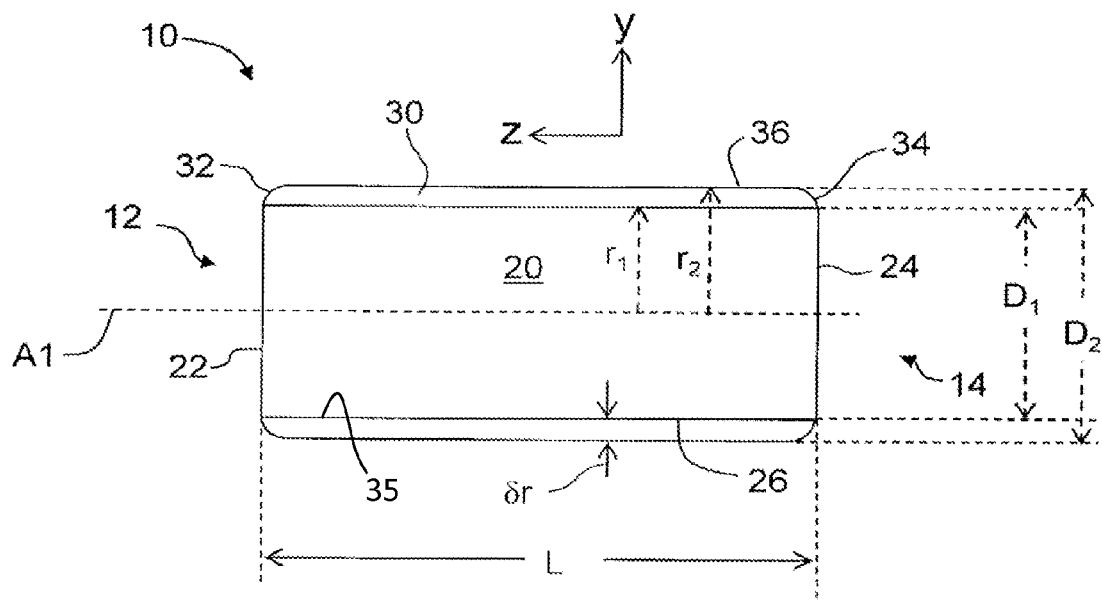
FIG. 2 is a cross-sectional view of the example GRIN lens of FIG. 1 as taken in the Y-Z plane.

FIG. 1 is an elevated view of an example GRIN lens 10 according to the disclosure. FIG. 2 is a cross-sectional view of the example GRIN lens 10 of FIG. 1 as taken in the Y-Z plane. GRIN lens 10 is circularly cylindrical and includes a central axis A1, a front end 12 and a back end 14. GRIN lens 10 includes a cylindrical central section 20 centered on axis A1 that includes a planar front surface 22, a planar back surface 24 and an outer surface 26 at a radius $r_1$. Central section 20 has a gradient index profile $n_A(r)$ that has a maximum at $n_A(0)=n_0$ (i.e., on axis) and a minimum $n_A(r_1)$ at outer surface 26. Example index profiles $n_A(r)$ are discussed below.

In various examples, central section has a diameter $D_1=2r_1$ in the range of 200 micrometers≤$D_1$≤420 micrometers, or 240 micrometers≤$D_1$≤380 micrometers, or 280 micrometers≤$D_1$≤360 micrometers. GRIN lens 10 has a length L, which in an example can be in the range from 1 mm≤L≤2 mm, with an exemplary length being in the range from about 1.2 mm to about 1.6 mm when the GRIN lens is used in an optical interface device as described below.

GRIN lens 10 also includes an annular cladding 30 that surrounds outer surface 26 of central section 20. Annular cladding 30 has a front surface 32, a back surface 34, an inner surface 35 at a radius $r_1$ and an outer surface 36 at a radius $r_2$. In an example embodiment, at least one of front surface 32 and back surface 34 is curved, and both front and back surfaces are shown as curved in FIG. 1 and FIG. 2 by way of example. In another example embodiment, front and back surfaces 32 and 34 are both planar.

Annular cladding 30 has an index profile $n_C(r)$ from $r_1$ to $r_2$. In various example, the radial annular thickness or width $\delta r=r_2-r_1$ is in the range of 5 micrometers≤$\delta r$≤50 micrometers or 10 micrometers≤$\delta r$≤40 micrometers.

Also, in various examples, the diameter $D_2$ of GRIN lens 10 is in the range of 210 micrometers≤$D_2$≤520 micrometers, or 260 micrometers≤$D_1$≤420 micrometers. In various examples, the ratio of $D_1/D_2$ is between 0.7 to 0.95, or between 0.75 and 0.9, or between 0.8 and 0.9. Annular cladding 30 may be comprised, for example, of undoped silica, fluorine-doped silica, a polymer such as a UV curable acrylate, germania doped with fluorine and chlorine, or a combination thereof. The refractive index of undoped silica is denoted $n_{silica}$.

Also in an example, the aspect ratio $D_2$:L of GRIN lens 10 is in the range from about 1:2 to about 1:10, with an exemplary aspect ratio being about 1:4.

Example GRIN Index Profiles

Figure 3A:
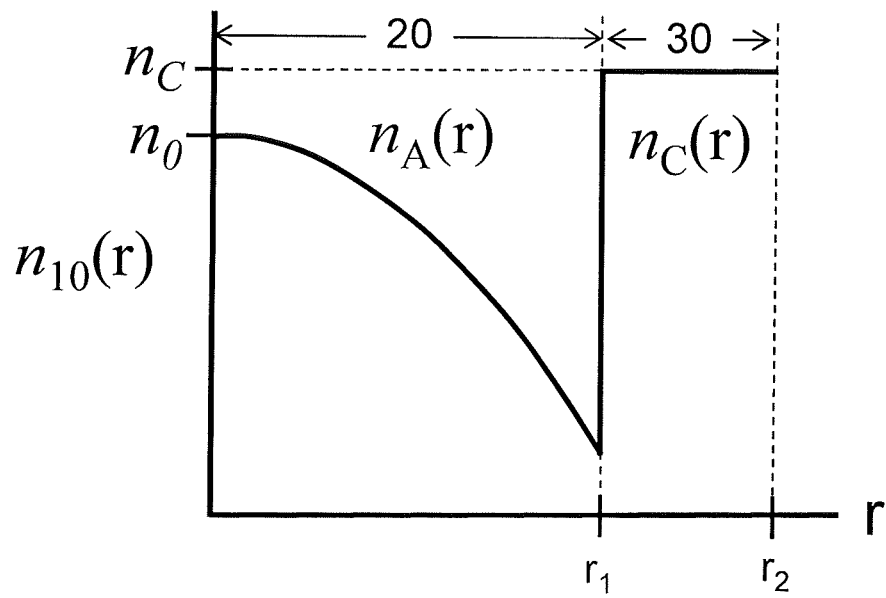
FIG. 3A to FIG. 3F set forth example index profiles for the GRIN lens disclosed herein.

FIG. 3A is an example index profile $n_{10}(r)$ of GRIN lens 10. Index profile $n_{10}(r)$ includes a parabolic or other polynomial central section index profile $n_A(r)$ from 0 to $r_1$, and a constant cladding index profile $n_C(r)=n_C$ from $r_1$ to $r_2$, where $n_C > n_A(0) = n_0$. In an example, central section index profile $n_A(r)$ is formed using germanium-doped silica. In one exemplary embodiment a lens as disclosed in FIG. 3A may be comprised of a germania doped core region 20 surrounded by a germania-doped annular cladding region 30.

Figure 3B:
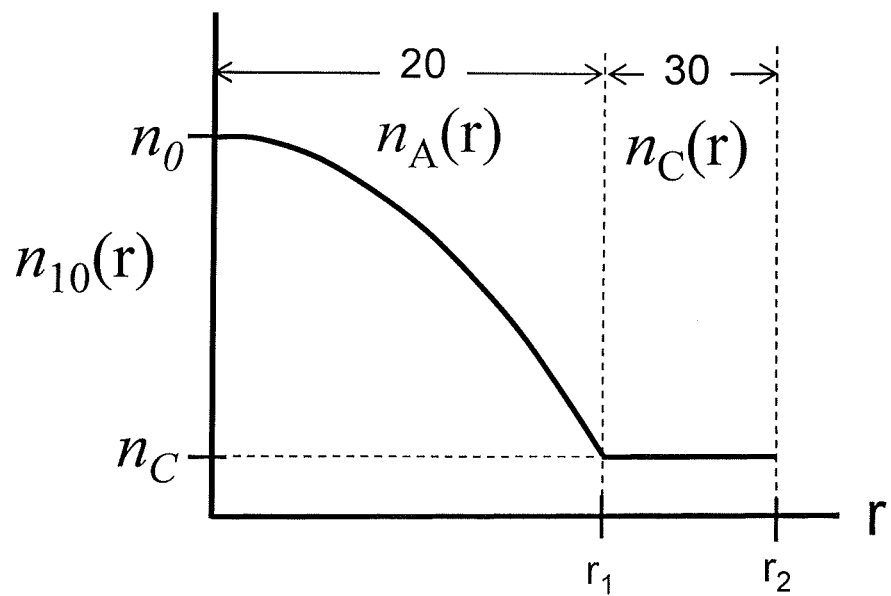

FIG. 3B is similar to FIG. 3A, but where $n_C = n_A(r_1)$. In an example, central section index profile $n_A(r)$ is parabolic as shown, while cladding index profile $n_C(r)$ is constant with $n_C = n_A(r_1)$. In a more general example, $n_C \geq n_A(r_1)$. In an example embodiment, the central section index profile $n_A(r)$ is a graded index profile that can be described by an alpha profile given as $n_A(r) = n_0 (1-2\Delta(r/r_1)^\alpha)^{1/2}$, where $\Delta = (n_0^2 - n_{silica}^2)/2n_0^2$ and where $\alpha$ can between 1.8 and 2.1, or between 1.85 and 2.05, or between 1.9 and 2 in different examples. In one exemplary embodiment, a lens as disclosed in FIG. 3B may be comprised of a germania-doped core region 20 surrounded by an annular cladding region 30 comprised of silica and that is essentially free of any updoping or downdoping additives, so that the index of region 30 may be equivalent to that of undoped silica.

Figure 3C:
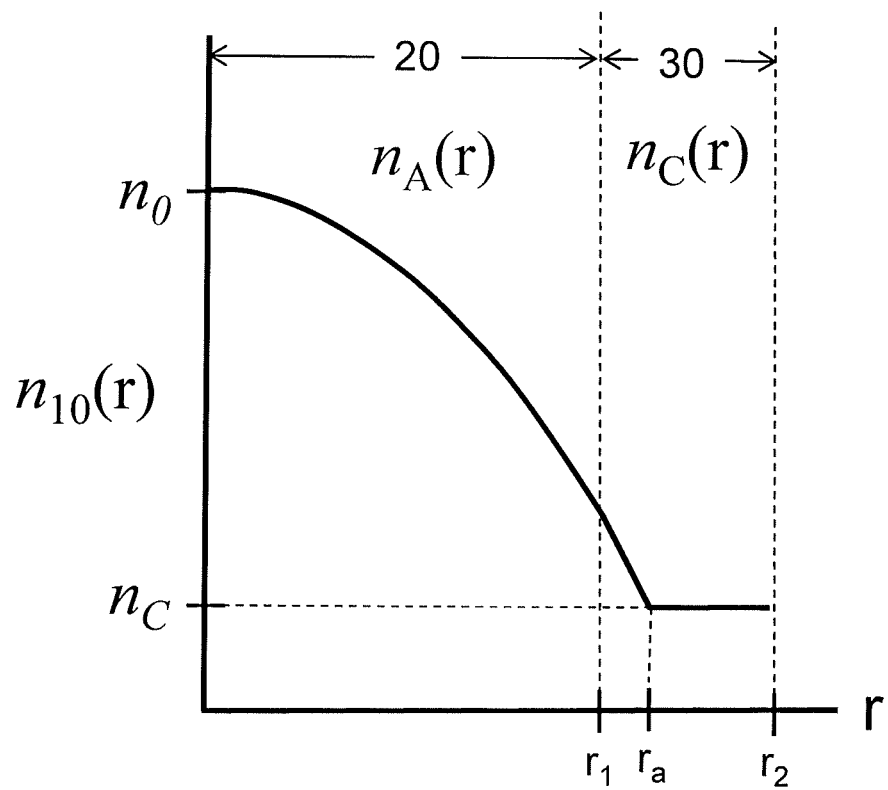

FIG. 3C illustrates an example similar to FIG. 3A and FIG. 3B, with the aforementioned parabolic or polynomial central section index profile $n_A(r)$, and with a cladding index profile $n_C(r)$ that varies with r from $r_1$ to $r_2$. In the example shown, $n_C(r)$ varies from $r_1$ to a radius $r_a < r_2$ in a manner that substantially continues the index profile of $n_A(r)$. Then, $n_C(r)$ from $r_a$ out to $r_2$ is constant $n_C = n_C(r_a)$. In certain embodiments, the central section index profile $n_A(r)$ is a graded-index alpha profile as described in FIG. 3B, with a between 1.8 and 2.1. In one exemplary embodiment, a lens as disclosed in FIG. 3C may be comprised of core region 20 which is germania doped until radius $r_1$, at which point the region parabolic shape is continued via fluorine doping until the parabolic shape is ended at $r_a$. Thus, in this embodiment, the between $r_1$ and $r_2$ comprises an index less than that of silica, e.g. this region may be fluorine doped to form annular cladding region 30. In one embodiment, $r_1$ may be between 165 and 175 microns, Although in one example the extended profile between $r_1$ and $r_a$ follows the same parametric curve as between the central axis and $r_1$ in the manner shown in the example, other profiles can also provide a performance advantage. By way of a specific example, even if the reduction of refractive index outside of $r_1$ occurs over a very short radial distance r, such as by diffusion of an essentially instantaneous change of refractive index, there is still a performance advantage.

Figure 3D:
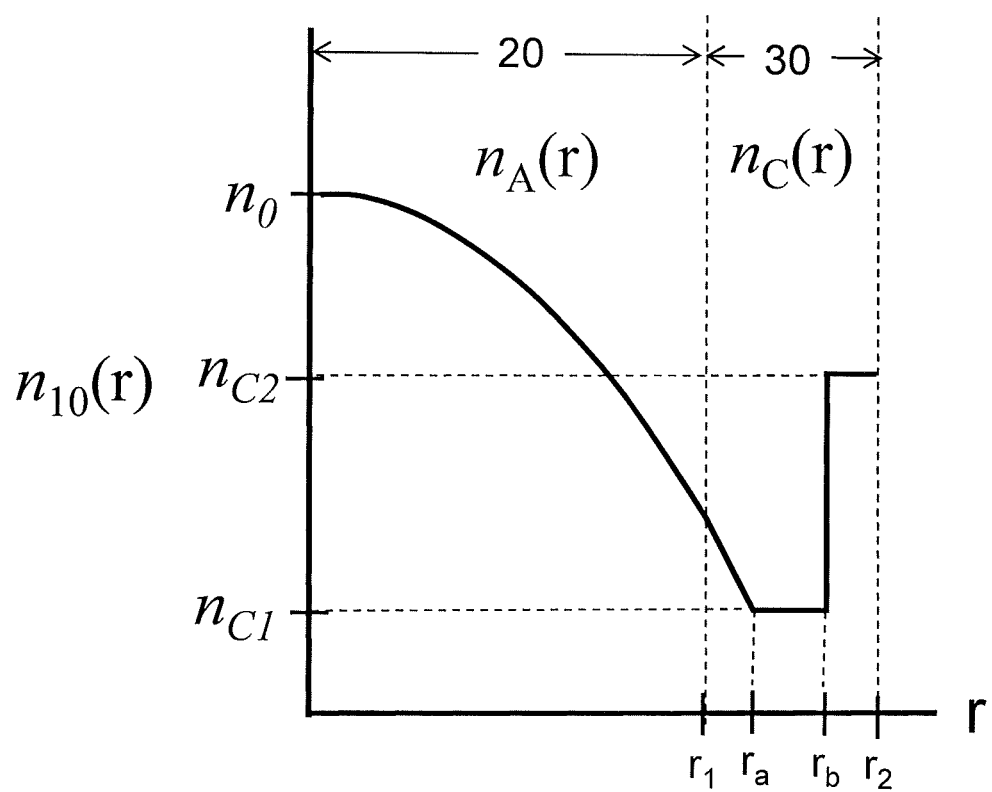

FIG. 3D is similar to FIG. 3C, except that $n_C(r)$ has a constant value $n_{C1}$ from $r_a < r < r_b$, where $r_b < r_2$. Then, $n_C(r)$ has a constant value $n_{C2} > n_{C1}$ from $r_b < r < r_2$. The index profile for $n_C(r)$ of FIG. 3D can be formed, for example, by fluorine doping of silica and/or by updoping the region between region $r_b$ and $r_2$ using dopants such as chlorine, germania, titania, phosphorus, etc.

The cladding index profiles $n_C(r)$ of FIG. 3C and FIG. 3D are generally advantageous in that the portion of the cladding between $r_1 < r < r_a$ functions as an extension of the central section 20 of GRIN lens 10. Effectively, for a given index profile of central section 20, the cladding index profiles of FIG. 3C and FIG. 3D increase the numerical aperture of GRIN lens 10 to a value higher than that produced by the index profile of central section 20 alone.

Figure 3E:
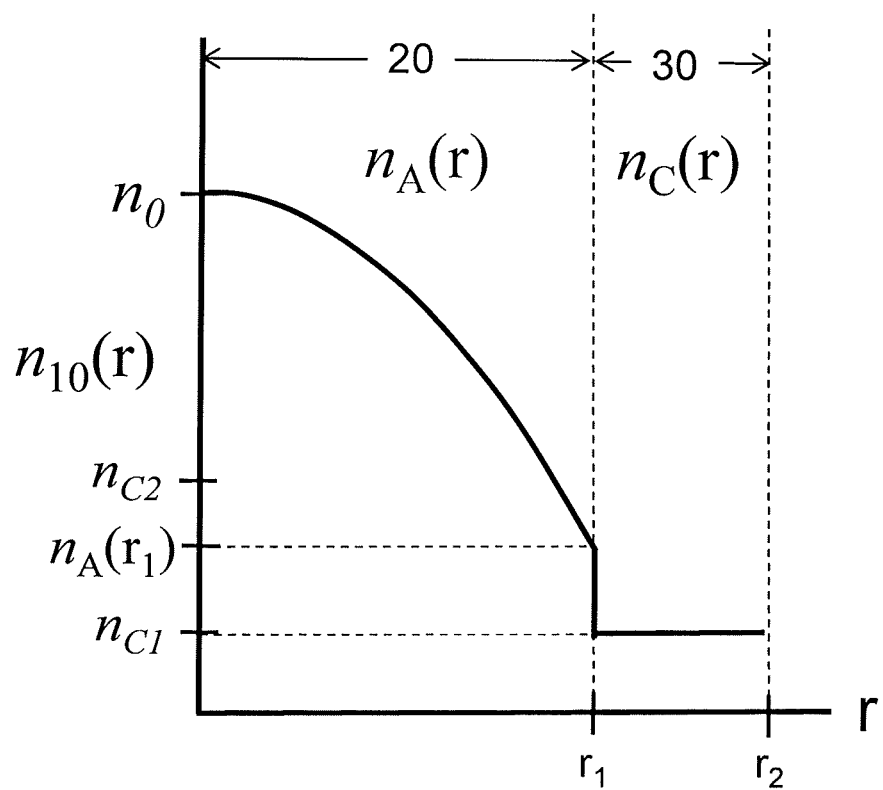

FIG. 3E is similar to FIG. 3B, but where $n_C < n_A(r_1)$. In an example, central section index profile $n_A(r)$ is parabolic as shown, while cladding index profile $n_C(r)$ is constant with $n_C < n_A(r_1)$. The refractive index $n_C < n_A(r_1)$ can be obtained, for example, by fluorine doping of silica. Alternatively, region $n_C$ is made of silica with region $n_A(r_1)$ made of germania and having an index pedestal at $r = r_1$.

Figure 3F:
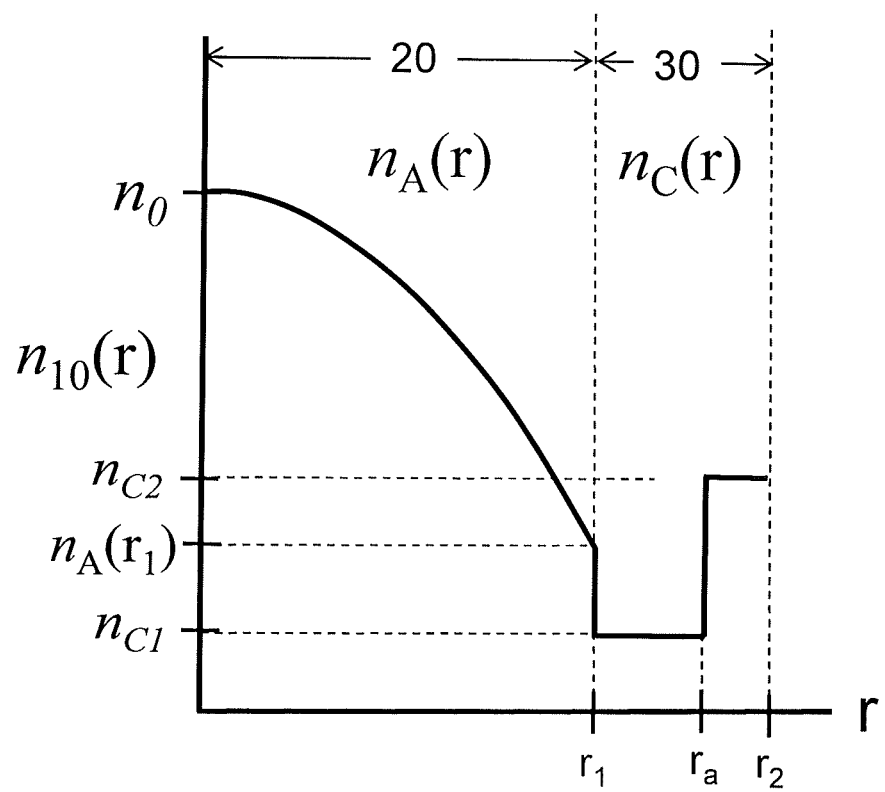

FIG. 3F illustrates an example similar to FIG. 3E, except that the cladding index profile $n_C(r)$ has a constant value $n_{C1}$ for $r_1 < r < r_a$, with $n_{C1} < n_A(r_1)$, and a second constant value $n_{C2}$ for $r_a < r < r_2$, with $n_{C2} > n_{C1}$. The refractive index $n_{C1}$ can be obtained, for example, by fluorine doping of silica in the region between $r_1$ and $r_a$. In the example shown in FIG. 3F, $n_{C2} = n_A(r_1)$. In a more general example, $n_{C2} > n_A(r_1)$; in another example $n_{C2} < n_A(r_1)$.

Although the cladding index profiles $n_C(r)$ of FIG. 3E and FIG. 3F may not be as effective as those of FIG. 3C and FIG. 3D, they will generally provide some benefit when GRIN lens 10 is used in an optical interface device because they will still guide light 70 via total internal reflection that would otherwise escape central section 20. That is to say, light 70 that propagates in central section 20 and that reaches outer surface 26 with an incidence angle greater than $\arcsin(n_{C1}/n_A(r_1))$ is reflected by total internal reflection back into central section 20.

Optical Interface Device

Figure 4:
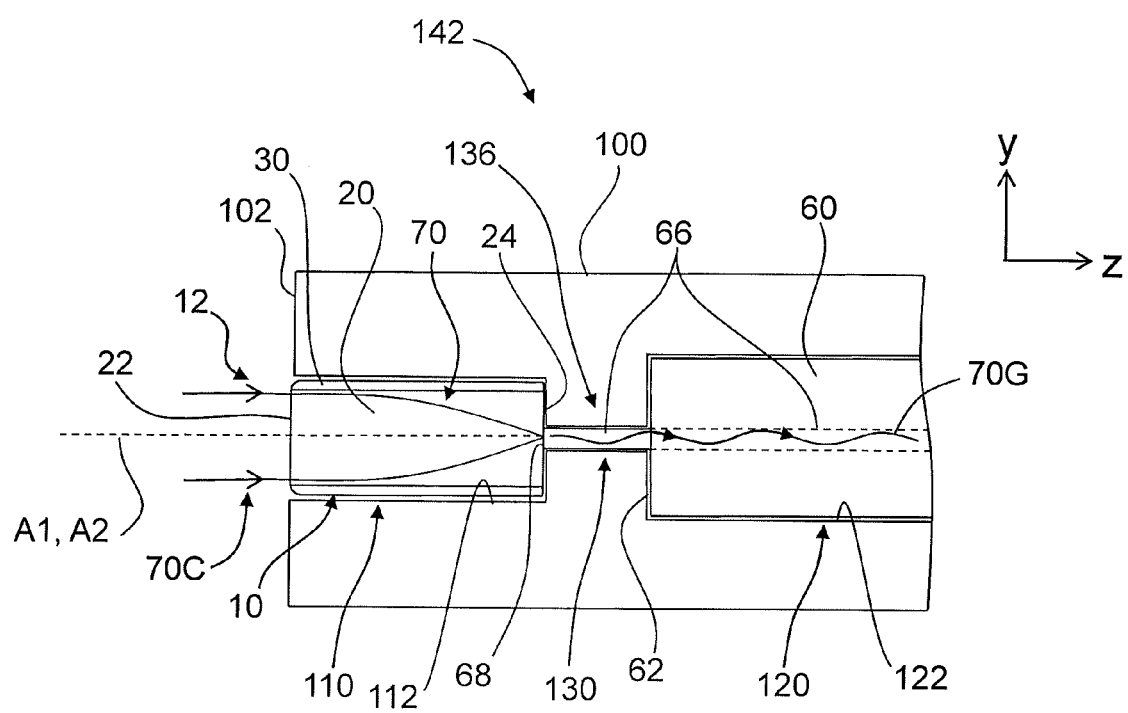
FIG. 4 is a cross-sectional view of a portion of an example optical interface device that includes a support member that supports at least one GRIN lens and at least one fiber optic cable that carries an optical fiber.

FIG. 4 is a cross-sectional view of a portion of an example optical interface device 142. Optical interface device 142 includes a support member 100 configured to support at least one GRIN lens 10 and at least one fiber optic cable 60 that carries an optical fiber 66. Support member 100 includes front and back surfaces 102 and 104, and front and back cylindrical chambers 110 and 120 connected by a bore section 130. Front and back cylindrical chambers 110 and 120 are open at front and back surfaces 102 and 104, respectively. Front cylindrical chamber 110 is defined by an inner surface 112 sized to accommodate GRIN lens 10, and back cylindrical chamber 120 is defined by an inner surface 122 sized to accommodate an end portion 62 of fiber optic cable 60. Optical fiber 66 extends from end portion 62 of fiber optic cable 60 and has an endface 68.

Thus, GRIN lens 10 is disposed in front chamber 110 and end portion 62 of fiber optic cable 60 is arranged within back chamber 120 so that optical fiber 66 resides in bore section 130. Optical fiber endface 68 thus resides immediately adjacent planar back surface 24 of central section 20 of GRIN lens 10. GRIN lens 10 and optical fiber 66 constitute a GRIN lens assembly 136 that defines an optical communication pathway. In the discussion below, the terms GRIN lens assembly 136 and optical communication pathway 136 are used interchangeably.

In one example of operation of optical interface device 142, collimated light 70C from a remote light source (not shown; see e.g., light emitter 410 of FIG. 8B) is incident upon planar front surface 22 of central section 20 of GRIN lens 10. This collimated light 70C is refracted by the positive power associated with the index profile $n_A(r)$ as described above, and follows a curved, converging path through central section 20, ultimately focusing onto optical fiber endface 68. This focused light 70 then becomes guided light 70G that travels in optical fiber 66 through fiber optic cable 60 and out of support member 100 to a remote location, e.g., a remote detector (not shown). Note that the optical path of light 70 in FIG. 4 can be reversed, i.e., light 70 can start out as guided light 70G in optical fiber 66, and gradually diverge within GRIN lens 10 to form collimated light 70C, which exits planar front surface 22 of central section 20 of the GRIN lens. Optical interface device 142 is sometimes referred to as an expanded-beam optical interface device because light 70 is expanded to form collimated light 70C.

The central section index profile $n_A(r)$ and the numerical aperture (NA) of optical fiber 66 are configured so that light 70 substantially remains within central section 20. In an example, no light 70 travels in annular cladding 30, while in another example only a small fraction of light 70 (e.g., 10% or less of the total amount of light emitted from optical fiber endface 68) travels in the annular cladding.

Figure 5:
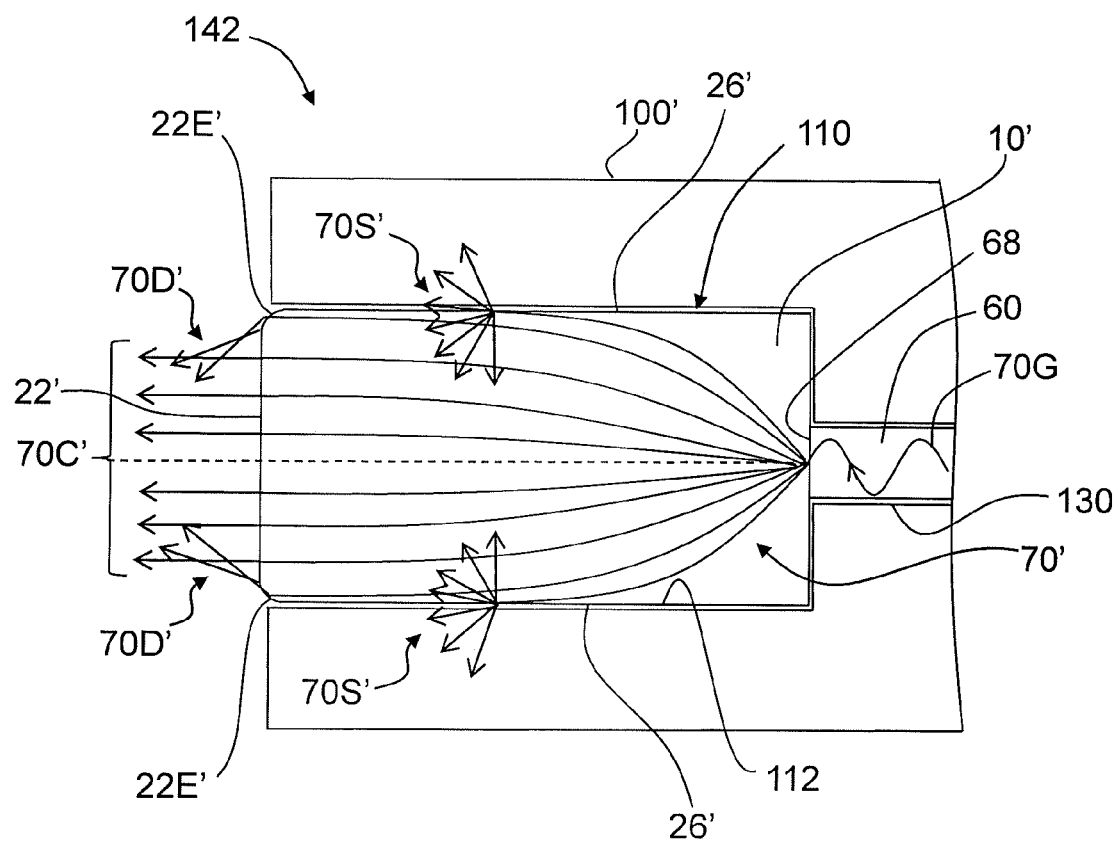
FIG. 5 is a close-up view of the front-end portion of a conventional optical interface device that includes a conventional GRIN lens that has no annular cladding, illustrating how light traveling within the conventional GRIN lens can interact with the support member and also be deflected by the rounded or curved edges of the conventional GRIN lens.

Annular cladding 30 defines an exclusion zone that prevents light 70 from being substantially affected by GRIN lens support member 100, and in particular inner surface 112 of front chamber 110. FIG. 5 is a close-up view of the front end portion of a conventional optical interface device 142' that includes a conventional GRIN lens 10' that has no annular cladding 30, i.e., GRIN lens 10' only includes a central section 20'. Light 70' is shown as traveling in the direction from optical fiber 66 towards GRIN lens 10' and out GRIN lens front surface 22'.

In this configuration, outer surface 26' of central section 20' defines the perimeter surface of GRIN lens 10'. In this configuration, light 70' can interact with inner surface 112 of front chamber 110, and with the perimeter surface of GRIN lens 10'. For example, light 70' that skirts outer surface 26' of central section 20' can interact with and scatter from front chamber inner surface 112', or interact with and scatter from imperfections of the perimeter surface of GRIN lens 10', as scattered light 70S'.

In addition, if front surface 22' of GRIN lens 10' includes a rounded or curved edge 22E', this rounded or curved edge can adversely impact the collimation of collimated output light 70C' by acting like an annular lens that forms convergent light 70D'. Convergent light 70D' does not travel in the desired direction (i.e. the direction of collimated light 70C'). Moreover, the roundedness or curvature of edge 22E' is typically not uniform and therefore can adversely affect the function of GRIN lens 10' in an unpredictable and uncontrolled way. This in turn can lead to a reduction in coupling efficiency when used as an expanded-beam optical interface device, and can lead to degraded image quality when GRIN lens 10' is used for imaging. In addition, scattered light 70S' as well as convergent light 70D' can potentially lead to cross-talk between adjacent optical pathways (channels) in a multi-channel optical interface assembly.

Figure 6:
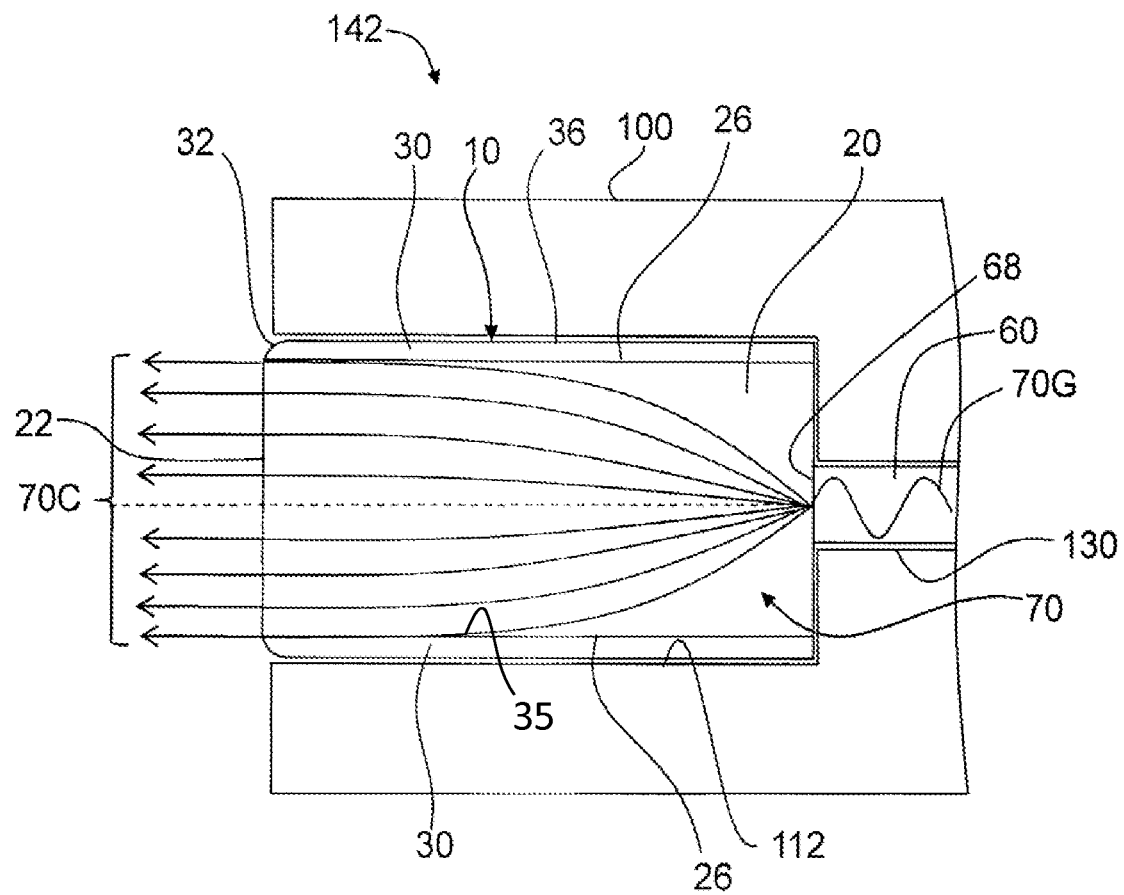
FIG. 6 is similar to FIG. 5, except that it shows the front-end portion of the optical interface device according to the disclosure, wherein the support member includes a GRIN lens as disclosed herein, illustrating how light traveling within the GRIN lens is excluded from the annular cladding.

FIG. 6 is similar to FIG. 5, except that it shows the optical interface device 142 according to the disclosure, wherein support member 100 includes GRIN lens 10 as disclosed herein. Annular cladding 30 defines the aforementioned exclusion zone between central section 20 and the inner surface 112 of front chamber 110 so that light 70 is substantially prevented from reaching the inner wall, and in an example completely prevents light 70 from reaching the inner wall and from reaching the perimeter surface of GRIN lens 10. In addition, annular cladding 30 substantially prevents light 70 from passing through curved front surface 32 of the annular cladding 30, and in an example completely prevents light 70 from passing through curved front surface 32 of the annular cladding 30. This ensures that substantially all (and in an example, all) of light 70 passes through planar front surface 22 of central section 20 and exits therefrom as collimated light 70C'. This in turn reduces the amount of light that is scattered light and that is directed in undesired directions, thereby generally improving light transmission efficiency and reducing the potential for cross-talk. Here, the terms "all" and "substantially all" in relation to light 70 do not include any light 70 that may be absorbed within central section 20.

Method of Forming GRIN Lens from GRIN Rod

Figure 7A:
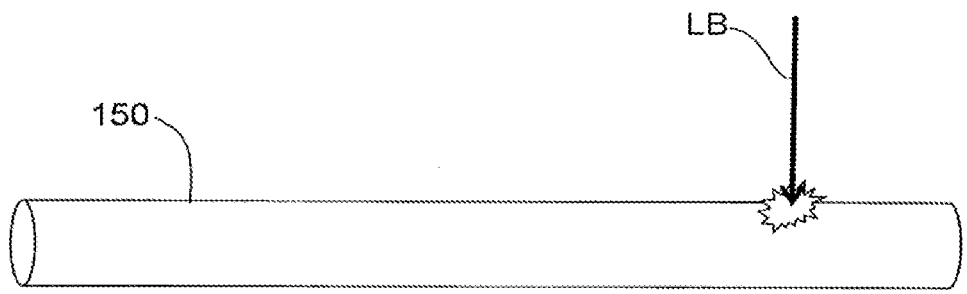
FIG. 7A through FIG. 7C are schematic diagrams that illustrate an example method of forming a GRIN lens from a GRIN rod according to the disclosure.
Figure 7B:
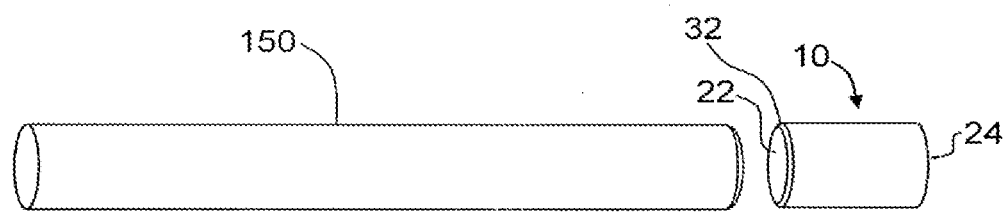
Figure 7C:
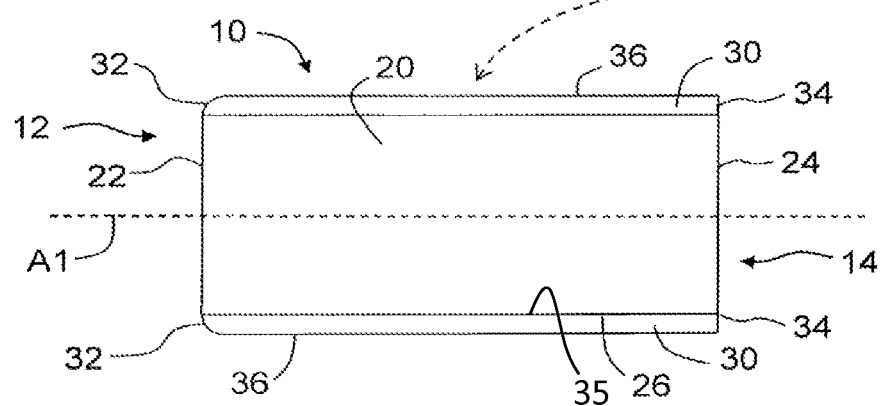

FIG. 7A through FIG. 7C are schematic diagrams that illustrate an example method of forming a GRIN lens 10 from a GRIN rod 150. In the method, a laser beam LB is used to cleave GRIN rod 150 to form GRIN lens 10. With reference to the cross-sectional view of FIG. 7C (which is similar to the view shown in FIG. 2), GRIN lens 10 has curved front annular surface 32 and a planar back annular surface 34. Note that central section 20 has a planar front surface 22.

When laser cleaving a silica or germania-doped silica GRIN rod 150 having a diameter $D_2$ in the range between about 300 micrometers to 400 micrometers, an example value for δr=30 micrometers. In an example, annular cladding 30 is formed to have a select value for δr so that any curvature caused by the laser cleaving process resides substantially entirely (or in an example, entirely) on front annular surface 32, i.e., the curvature does not reach planar front surface 22 of central section 20. In an example, a portion of front annular surface 32 that resides immediately adjacent planar front surface 22 can be planar. In an example, curved front annular surface 32 can represent between 10% to 30% of the total surface area of GRIN lens front end 12, i.e., of the combined surface area of planar front surface 22 and front annular surface 32.

In an example, GRIN rod 150 from which GRIN lenses 10 are formed by laser cleaving is itself formed by applying annular cladding 30 to an existing GRIN rod consisting of central section 20. In another example, GRIN rod 150 is formed by drawing a GRIN cane 150C (FIG. 11A) consisting of central section 20 down to a suitable diameter while applying a single-layer cladding to form annular cladding 30. The GRIN cane 150C consisting of central section 20 can be formed using chemical vapor deposition techniques known in the art. Example materials for forming GRIN cane 150C include silica and germania.

Optical Interface Devices and Assemblies

Figure 8A:
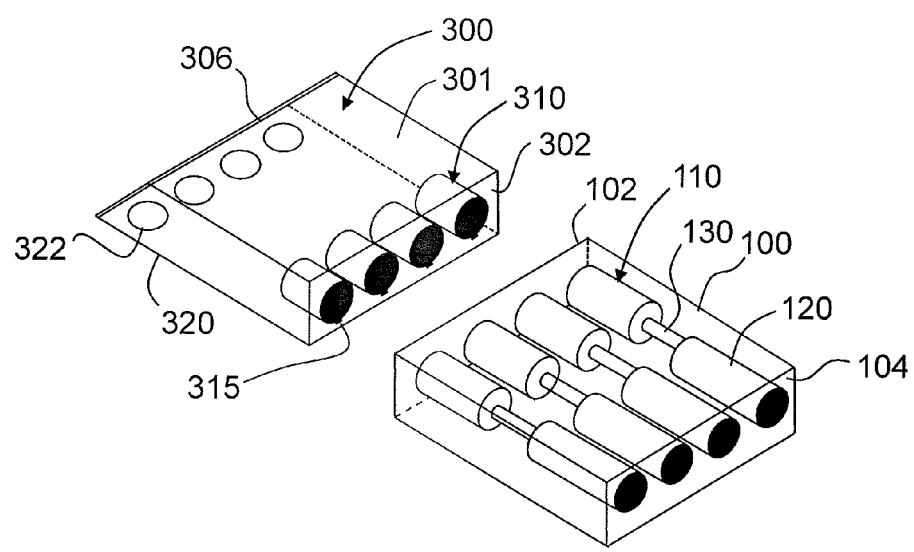
FIG. 8A is an elevated view of first and second support members used to form respective first and second optical interface devices.
Figure 8B:
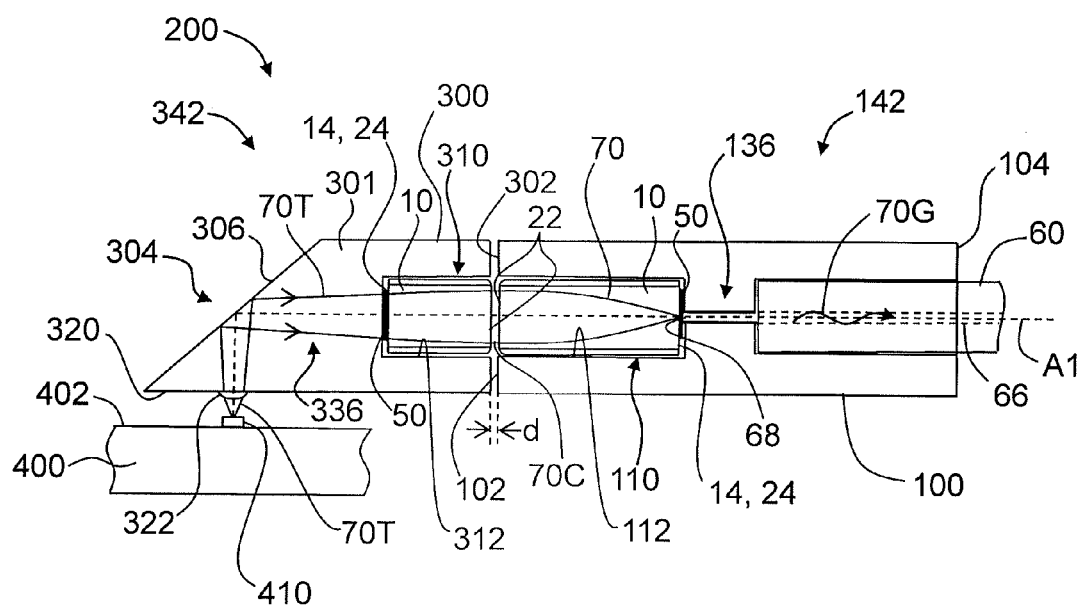
FIG. 8B is a cross-sectional view of first and second optical interface devices formed from the first and second support members and configured to form an optical interface assembly.

FIG. 8A is an elevated view of first and second support members 100 and 300 used to form respective optical interface devices 142 and 342 that in turn can be used to form an optical interface assembly. FIG. 8B is a cross-sectional view of the first and second optical interface devices 142 and 342 as formed from the first and second support members 100 and 300 of FIG. 8A, with the optical interface devices interfaced to form optical interface assembly 200. In an example, optical interface device 142 constitutes a plug and optical interface device 342 constitutes a receptacle.

Support members 100 and 300 are shown in FIG. 8A by way of example as being configured to support multiple optical pathways 136 and 336. Generally, support members 100 and 300 can support one or more optical pathways. FIG. 8A illustrates an embodiment where front chambers 310 of support member 300 each include a longitudinal slot 315 that allows for air to escape when a GRIN lens 10 or a GRIN rod 150 is inserted into the chamber. Front chambers 110 of support member 100 may also include corresponding longitudinal slots (not shown).

Optical interface device 142 includes support member 100 having a back surface 104. Support member 100 includes multiple optical communication pathways 136, which are defined by respective multiple GRIN lenses 10 and the associated optical fibers 66. In FIG. 8B, support member front surfaces 102 and 302 are confronting and are shown as defining a small gap of dimension d in between. In an alternative embodiment, GRIN lens front ends 12 can be brought into contact to form one or more solid-to-solid GRIN lens interfaces. In an example, gap dimension d is in the range from 0 micrometers≤d≤200 micrometers.

With reference to FIGS. 8A and 8B, support member 300 has a body 301 with front surface 302 and includes front cylindrical chambers 310 each having an inner surface 312 configured to support a GRIN lens 10. Support member body 301 is made of a substantially transparent material at the wavelength of light 70 used. This wavelength can be, for example, in the range from 850 nm to 1550 nm. An example transparent material for support member body 301 is a transparent resin, such as unfilled Polyetherimide (PEI), sold by the General Electric Company under the trademarked name ULTEM® 1010. Support member body 301 may be, for example, a molded unitary structure, a molded and machined structure, or a multi-component structure. In an example, an adhesive 50 is used to hold GRIN lenses 10 in respective cavities 110 and 310 of respective support members 100 and 300. Adhesive 50 is shown by way of example as disposed adjacent GRIN lens back ends 14 and the corresponding portions of inner surfaces 112 and 312 of respective front chambers 110 and 310 of respective support members 100 and 300. In an example, adhesive 50 is made of an index-matching material. An example adhesive 50 comprises curable glue, such as a heat-curable or ultraviolet-curable glue.

Support member body 301 includes a back end 304 that has an angled surface 306 configured to internally reflect light 70 traveling therein. Support member body 301 also has a bottom surface 320 with one or more lens elements 322 formed thereon. Lens elements 322 are respectively aligned with the folded axis A1 of GRIN lenses 10 supported in respective front chambers 310.

The example optical interface device 342 of FIG. 8B thus includes multiple optical communication pathways 336 defined by respective multiple GRIN lenses 10, the portion of support member body 301 through which light 70 travels, and lens elements 322 on bottom surface 320.

Optical interface device 342 is shown as disposed relative to a circuit board 400. Circuit board 400 includes an upper surface 402 that operably supports one or more light emitters 410, such one or more vertical-chamber surface emitting lasers (VCSELs). Optical interface device 342 is arranged such that its bottom surface 320 is adjacent and substantially parallel to circuit board upper surface 402, so that light emitters 410 are optically aligned with respective lens elements 322.

With reference to FIG. 8B, in an example of the operation of optical interface assembly 200, divergent light 70T is emitted by light emitter 410 and is incident upon lens element 322. Lens element 322 has positive optical power and serves to make divergent light 70T less divergent as it enters support member body 301 at bottom surface 320. Light 70T then travels to angled surface 306, where it internally reflects and continues toward GRIN lens 10. Light 70T enters the planar back surface 24 of central section 20 as diverging light.

The index profile $n_A(r)$ for GRIN lens 10 in optical interface device 342 is configured to receive the diverging light 70T and form substantially collimated light 70C, which exits front planar surface 22 of central section 20. Note that GRIN lens 10 of optical interface device 342 can be configured to generate a desired level of divergence of light 70T, e.g., light 70T can be made collimated or even convergent. Substantially collimated light 70C from GRIN lens 10 of optical interface device 342 enters planar front surface 22 of GRIN lens 10 of optical interface device 142. This substantially collimated light 70C is then optically coupled into optical fiber 66 at endface 68 in the manner described above in connection with FIG. 4.

GRIN Lens Assembly

Figure 9A:
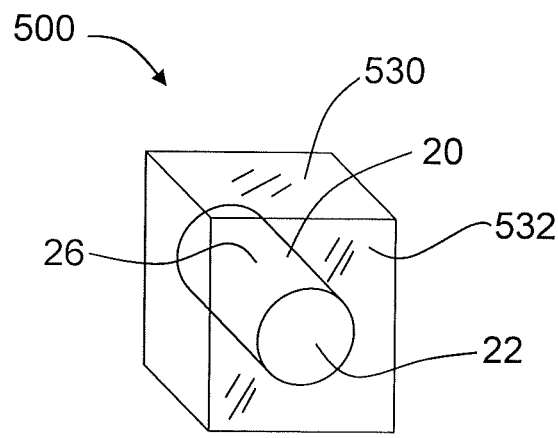
FIG. 9A and FIG. 9B are front-elevated views of an example embodiment of a GRIN lens assembly, wherein one central section (FIG. 9A) or multiple central sections (FIG. 9B) is/are embedded in a monolithic transparent medium.
Figure 9B:
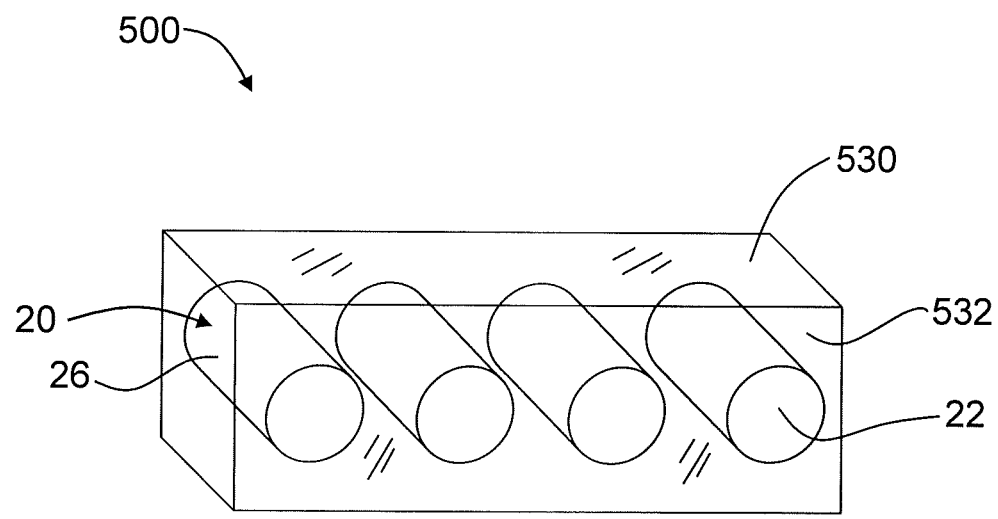

FIG. 9A and FIG. 9B are front-elevated views of an example embodiment of a GRIN lens assembly 500 wherein one central section 20 (FIG. 9A) or multiple central sections (FIG. 9B) of GRIN lens 10 are embedded in a monolithic transparent medium 530 Monolithic transparent medium 530 has a planar front surface 532 that in an example is coincident with central section planar front surface(s) 22. In an example, GRIN lens assembly 500 is formed by forming a monolithic blank out of a transparent material and inserting GRIN canes 150C, or by forming a similar monolithic block by soot pressing or CVD soot laydown followed by consolidation. An example monolithic transparent medium 530 is formed from glass such as silica.

Figure 10A:
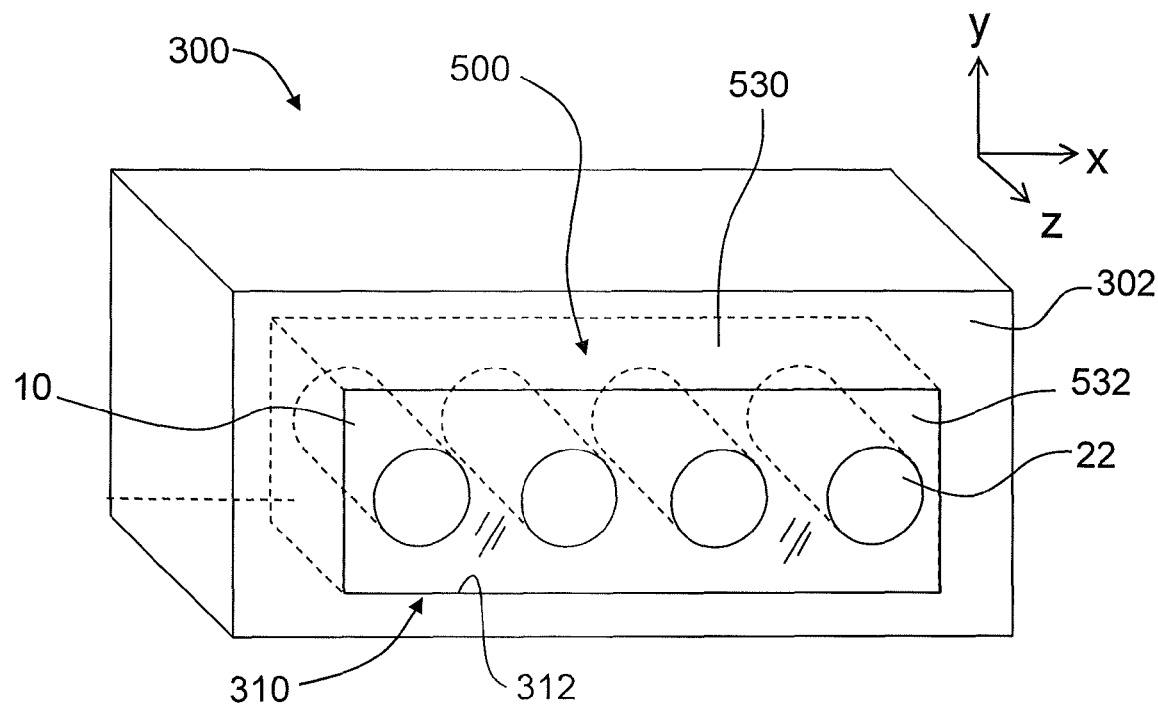
FIG. 10A is a front-elevated view and FIG. 10B is a cross-sectional view of an example support member that includes the GRIN lens assembly of FIG. 9B.
Figure 10B:
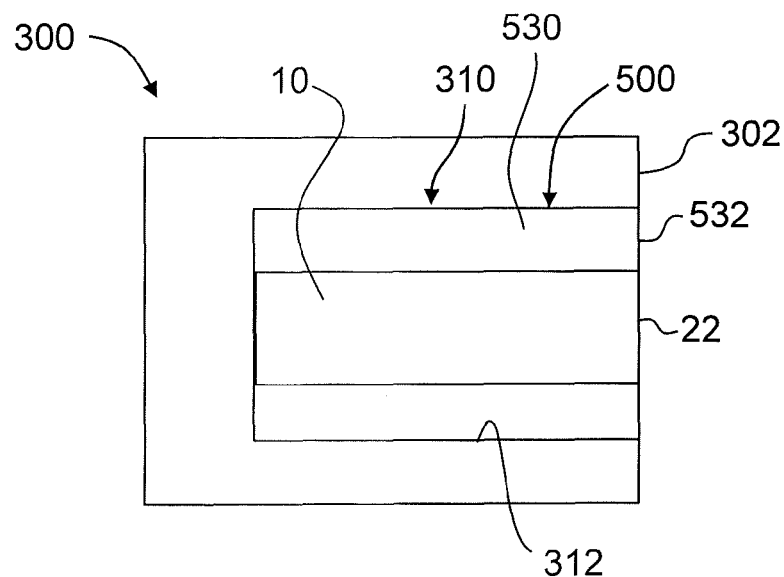

FIG. 10A is a front-elevated view and FIG. 10B is a cross-sectional view of an example support member 300 that includes GRIN lens assembly 500 incorporated therein. Support member 300 includes a relatively large front chamber 310 having an inner surface 312 sized to accommodate GRIN lens assembly 500. This configuration of support member 300 prevents light 70 traveling in GRIN lenses 10 in GRIN lens assembly 500 from encountering inner surface 312 of front chamber 310 and thus serves an analogous purpose to annular cladding 30. In FIG. 10A, the GRIN lens assembly 500 can be thought of as an alternative embodiment of GRIN lens 10, where instead of an annular cladding, the cladding has a rectangular cross-sectional shape that surrounds outer surface 26 of central section 20.

Figure 11A:
FIG. 11A is a side view of an example GRIN cane with a circular cross-section used to form a circular GRIN rod via a drawing process.
Figure 11B:
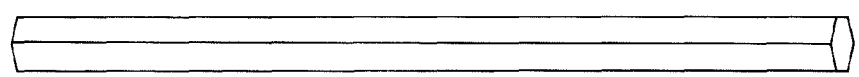
FIG. 11B shows a side view of an example GRIN cane having a polygonal (e.g., hexagonal, as shown) cross-sectional shape that can be used to form a GRIN rod having a polygonal cross-sectional shape.
Figure 11C:
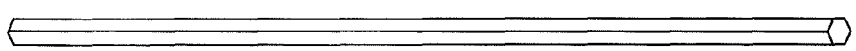
FIG. 11C is a side view of an example GRIN rod having a polygonal cross-sectional shape and formed by drawing the polygonal GRIN cane of FIG. 11B.
Figure 11D:
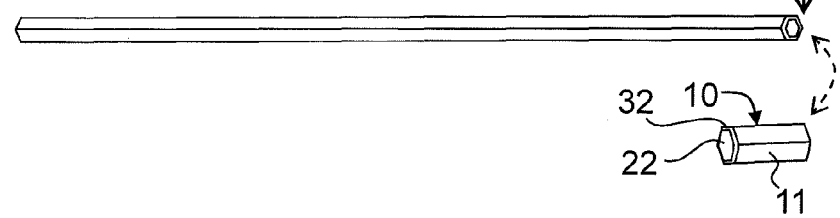
FIG. 11D is similar to FIG. 11C and shows a laser beam being used to laser cleave the polygonal GRIN rod of FIG. 11C to form a polygonal GRIN lens.

FIG. 11A is a side view of an example GRIN cane 150C used to form GRIN rod 150. The GRIN cane 150C of FIG. 11A has a circular cross-sectional shape. FIG. 11B is a side view of an example GRIN cane 150C that has a polygonal (e.g., hexagonal, as shown) cross-sectional shape. Polygonal GRIN cane 150C can be formed by machining the circular GRIN cane of FIG. 11A. Polygonal GRIN cane 150C can then be drawn into a polygonal GRIN rod 150, as shown in FIG. 11C. FIG. 11D is similar to FIG. 11C and shows laser beam LB being used to laser cleave the polygonal GRIN rod 150 of FIG. 11C to form a polygonal GRIN lens 10.

Figure 12A:
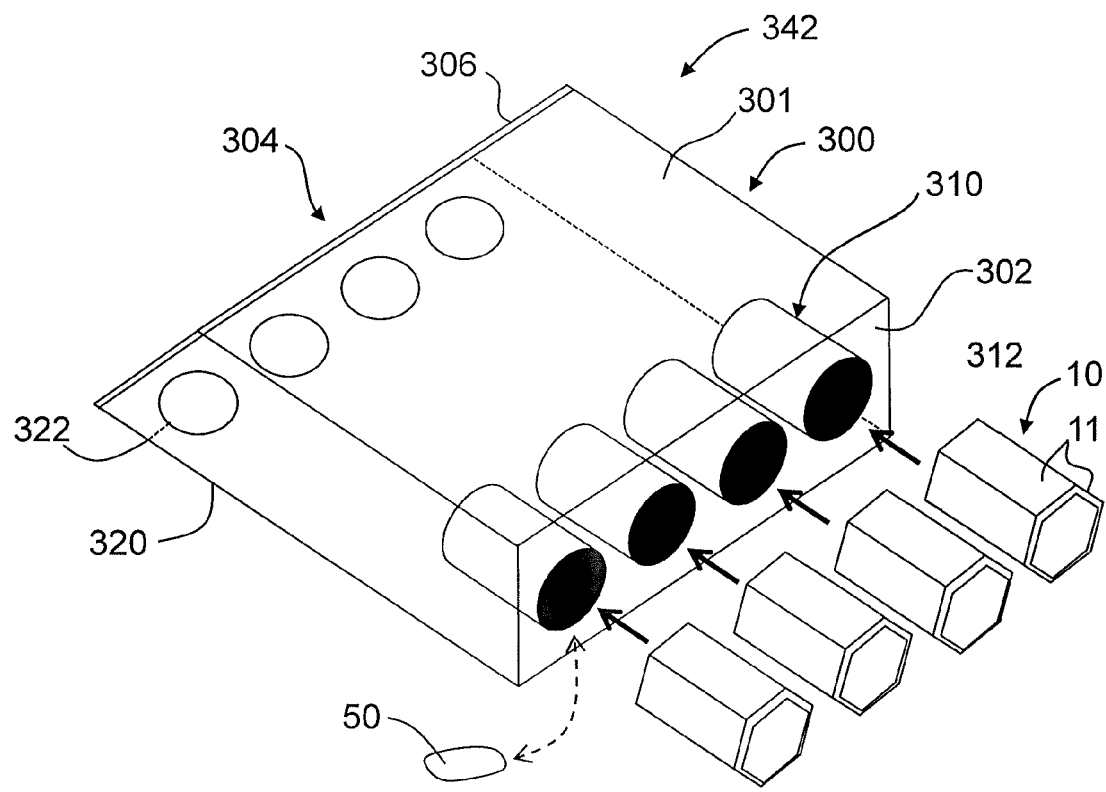
FIG. 12A is an elevated, exploded view of an example optical interface device having a support member with cylindrical front chambers that are used to support polygonal GRIN lenses.
Figure 12B:
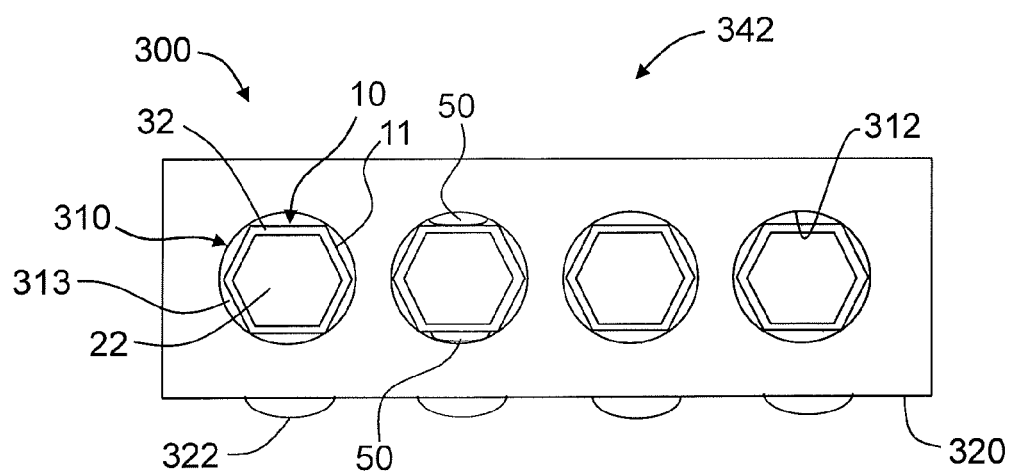
FIG. 12B is a front-on view of the optical interface device FIG. 12A and shows the polygonal GRIN lenses disposed within the cylindrical front chambers of the support member.

FIG. 12A is an elevated, exploded view of an example optical interface device 342 having a support member 300 similar to that shown in FIG. 8A, wherein the support member includes cylindrical front chambers 310. Polygonal GRIN lenses 10 are shown adjacent front end 302 of support member 300 in the exploded view, with the arrows indicating that the GRIN lenses reside within the respective cylindrical front chambers 310. FIG. 12B is a front-on view of the optical interface device 342 of FIG. 12A and shows GRIN lenses 10 disposed within cylindrical front chambers 310.

Polygonal GRIN lenses 10 have flat outer surfaces ("flats") 11 that run longitudinally to define the polygonal cross-sectional shape. Flats 11 serve to form gaps 313 between inner surface 312 of front chamber 310 and GRIN lens 10. Gaps 313 allow room for adhesive 50 to be provided in front chambers 310 to hold the GRIN lenses 10 therein, and also allow for air to escape when GRIN lens 10 is inserted into cylindrical front chamber 310. Gaps 313 also allow for flowable adhesives 50 to flow within chamber 310 and cover more of inner surface 312 as GRIN lens 10 is urged into the front chamber. Alternatively, GRIN lens 10 can have a circular cross-section and cylindrical front chamber 310 can have a polygonal cross-section to achieve essentially these same benefits.

Figure 13:
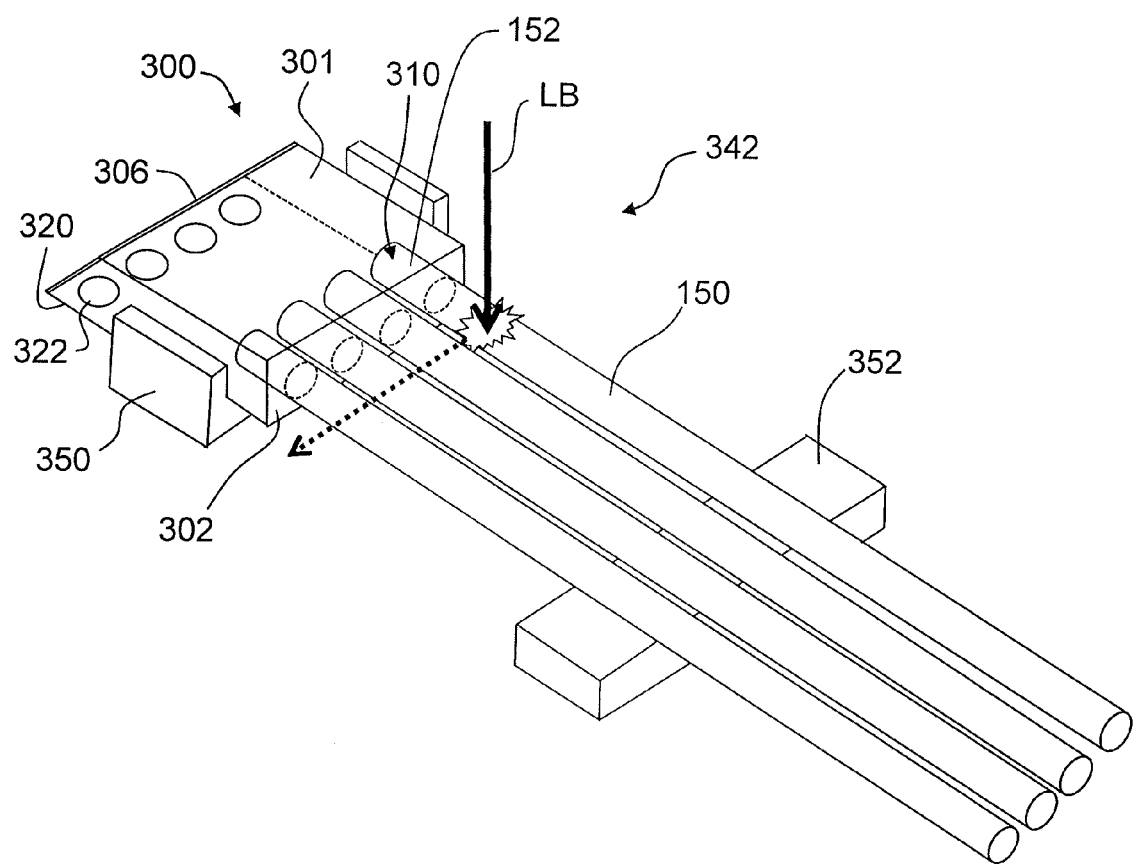
FIG. 13 is an elevated view of multiple GRIN rods having respective end portions residing within cylindrical front chambers of the support member of the optical interface device, with the GRIN rods being laser processed to form the GRIN lenses that are supported by the support member.

FIG. 13 is an elevated view of GRIN rods 150 having respective end portions 152 that reside within cylindrical front chambers 310 of support member 300 of optical interface device 342. Support member 300 is held or otherwise supported by a first support fixture 350, and GRIN rods 150 are held or otherwise supported by a second support fixture 352. Laser beam LB is used to laser cleave GRIN rods 150, as discussed above in connection with FIG. 7A through FIG. 7C, thereby forming corresponding GRIN lenses 10.

Figure 14A:
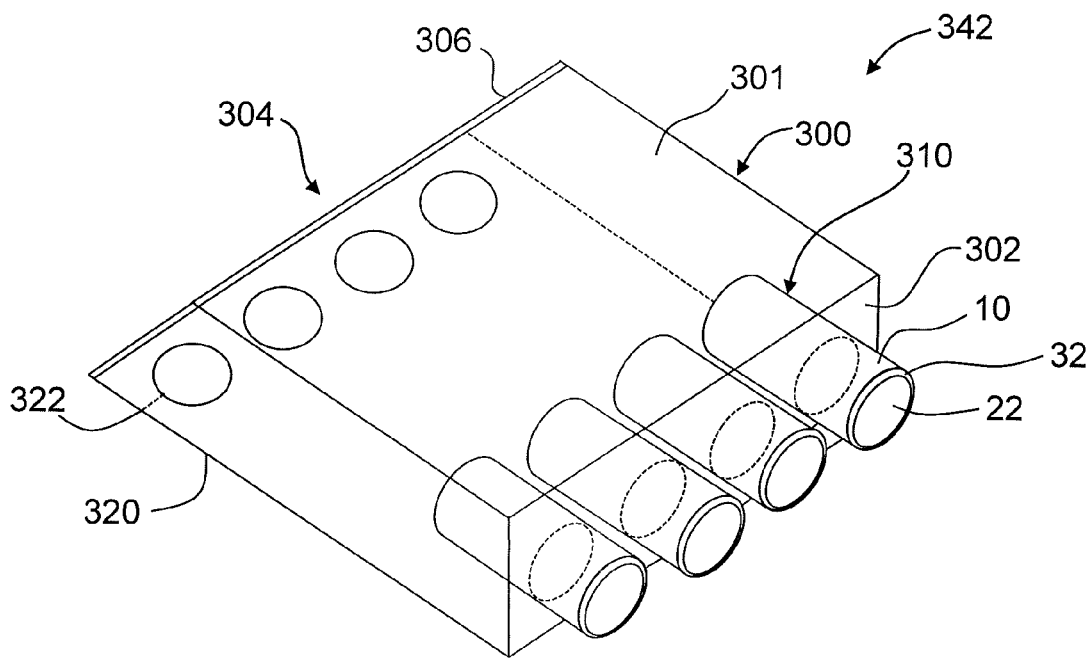
FIG. 14A is a front-elevated view of the support member after the GRIN rods have been laser cleaved as shown in FIG. 13 so that a front portion of each of the GRIN lenses extends beyond the support member front surface.
Figure 14B:
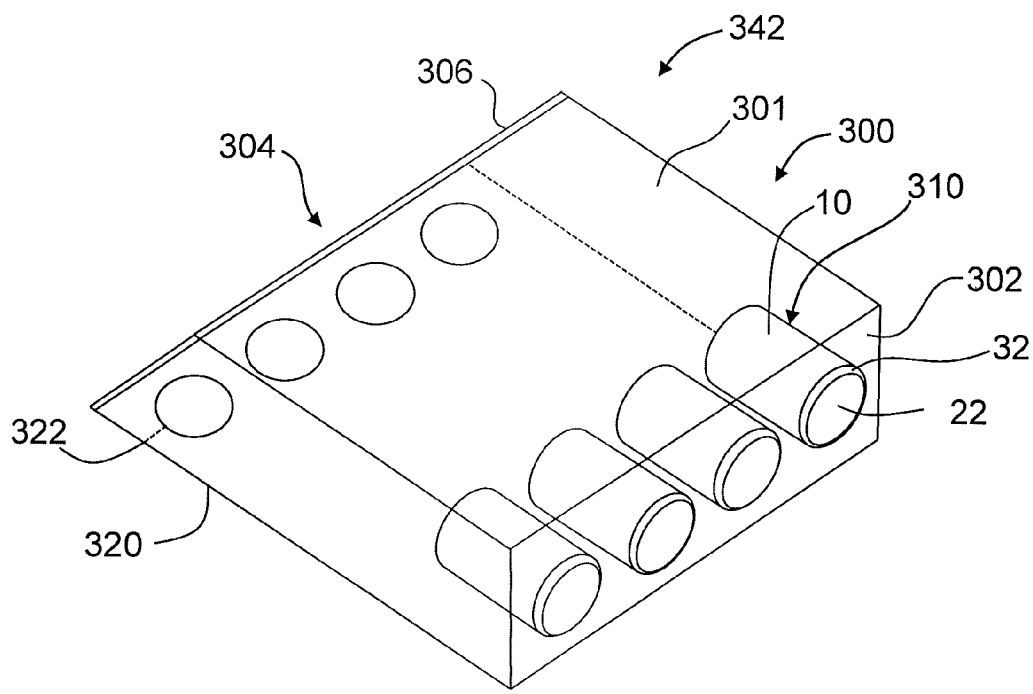
FIG. 14B is similar to FIG. 14A and illustrates an example optical interface device, where the GRIN lenses are pushed back into the front chamber so that the GRIN lens front ends are substantially flush with the support member front end.

FIG. 14A is a front-elevated view of optical interface device 342, with a portion of each of the GRIN lenses 10 extending from front surface 302 of support member 300. In an example, end portions 152 of GRIN rods 150 are initially only partially inserted into cylindrical front chambers 310. Then, after GRIN lenses 10 are formed by laser cleaving, the GRIN lenses can be inserted the rest of the way into front chambers 310 so that their front ends 12 are generally flush with support member front surface 302, as shown in FIG. 14B.

An example method of forming an optical interface device 142 or 342 as described above includes mounting a suitable support member 100 or 300 in fixture 350 and providing (e.g., injecting) adhesive 50 into front chambers 110 or 310 (see FIG. 12A). Respective end portions 152 of GRIN rods 150 are then inserted into corresponding front chambers 110 or 310. Laser beam LB is then used to laser cleave GRIN rods 150 at a select distance from front surface 102 or 302 of support member 100 or 300 to form GRIN lenses 10. Adhesive 50 is then cured (e.g., by the application of heat) to hold the GRIN lenses 10 within chambers 110 or 310. As discussed above, some space can be left between the GRIN rod end 152 and the chamber endwall so that after GRIN lenses 10 are formed, they can be pushed into the chamber 110 or 310 so that the GRIN lens end 12 is substantially flush with front surface 102 or 302 of support member 100 or 300.

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

What is claimed is:

1. A gradient-index (GRIN) lens assembly formable using a laser cleaving process, comprising:
    a cylindrical section having a polynomial or parabolic GRIN index profile $n_A(r)$, planar front and back surfaces, an outer surface, and a diameter $D_1$ in the range of 200 micrometers $\leq D_1 \leq$ 420 micrometers;
    an annular cladding of radial width $\delta r$ and an outer diameter $D_2$ surrounding the central section outer surface and having front and back annular surfaces and either a constant or a varying refractive index, wherein the radial width or is selected so that a surface curvature caused by the laser cleaving process resides substantially entirely on the front annular surface, where the central section index profile $n_A(r)$ is given by $n_A(r)=n_0 (1-2\Delta(r/r_1)^\alpha)^{1/2}$, where $\Delta=(n_0^2-n_C^2)/2/n_0^2$, where $\alpha$ is between 1.8 and 2.1, and $n_0$ and $n_C$ are constants; and
    an optical fiber optically coupled to the central section at the planar back surface.

2. The GRIN lens assembly of claim 1, wherein the back annular surface is curved.

3. The GRIN lens assembly of claim 1, further comprising the radial width $\delta r$ being in the range of 5 micrometers $\leq \delta r \leq$ 50 micrometers.

4. The GRIN lens assembly of claim 1, where the ratio of $D_1/D_2$ is between 0.7 and 0.95.

5. The GRIN lens assembly of claim 1, where the central section is comprised of germania and the annular cladding region is comprised of germania, fluorine and chlorine.

6. The GRIN lens assembly of claim 1, further comprising the annular cladding formed from at least one material from the group of materials comprising: silica, doped silica, fluorine-doped silica, and a polymer.

7. An optical interface device comprising:
    at least one GRIN lens assembly according to claim 1; and
    a support member having front and back ends and configured to operably support the at least one GRIN lens assembly.

8. The GRIN lens assembly of claim 7, further comprising an adhesive disposed within the gaps of the at least one cylindrical chamber to hold the at least one GRIN lens therein.

9. The GRIN lens assembly of claim 1, further comprising:
    the at least one GRIN lens of the at least one GRIN lens assembly having a polygonal cross-sectional shape; and
    the support member having at least one circularly cylindrical chamber and that supports the at least one GRIN lens to define gaps between the GRIN lens and the cylindrical chamber.

10. An optical interface device for transmitting light having a wavelength, comprising:
    at least one gradient-index (GRIN) lens element, with each GRIN lens element having a) a cylindrical central section having a polynomial or parabolic GRIN index profile, planar front and back surfaces, an outer surface, and a diameter $D_1$ in the range of 200 micrometers $\leq D_1 \leq$ 420 micrometers, and b) an annular cladding surrounding the central section outer surface and having front and back annular surfaces, a radial width $\delta r$ and a constant or a varying refractive index, and where the central section index profile $n_A(r)$ is given by $n_A(r)=n_0 (1-2\Delta(r/r_1)^\alpha)^{1/2}$, where $\Delta=(n_0^2-n_C^2)/2/n_0^2$, where $\alpha$ is between 1.8 and 2.1, and $n_0$ and $n_C$ are constants, wherein the radial width $\delta r$ is selected so that a surface curvature caused by a laser cleaving process resides substantially entirely on the front annular surface; and
    a support member configured to operably support the at least one GRIN lens element within a front chamber, the support member operably supporting at least one optical pathway that includes the at least one GRIN lens element.

11. The optical interface device of claim 10, wherein the back annular surface is curved.

12. An optical interface assembly, comprising:
    first and second optical interface devices each according to claim 10, the first and second optical interface devices being interfaced so that their respective GRIN lens planar front surfaces are confronting and spaced apart by a distance d in the range of 0 micrometers $\leq d \leq$ 200 micrometers.

13. An optical interface device according to claim 10, wherein the support member comprises a body that is substantially transparent to the wavelength of light and having a back end with an angled facet, and a bottom surface having least one lens element, with the at least one GRIN lens element, the support member body and the at least one lens element defining an optical communication pathway.

14. The optical interface device of claim 10, further comprising the annular cladding having a width or in the range of 5 micrometers $\leq \delta r \leq$ 50 micrometers.

15. The optical interface device of claim 14, further comprising the annular cladding formed from at least one material from the group of materials comprising: silica, doped silica, fluorine-doped silica, and a polymer.

16. A method of forming a gradient-index (GRIN) lens, comprising:
  drawing a cylindrical GRIN cane having a polynomial or parabolic GRIN index profile, to form a cylindrical GRIN rod that defines a central section with an outer surface, the central section having a diameter $D_1$ in the range of 200 micrometers$\leq D_1 \leq$420 micrometers, where the central section index profile $n_A(r)$ is given by $n_A(r)=n_0(1-2\Delta(r/r_1)^\alpha)^{1/2}$, where $\Delta=(n_0^2-n_C^2)/2n_0^2$, where $\alpha$ is between 1.8 and 2.1, and $n_0$ and $n_C$ are constants;
  cladding the cylindrical GRIN rod outer surface with an annular cladding having a radial width $\delta r$ in the range of 5 micrometers$\leq \delta r \leq$50 micrometers; and
  laser cleaving the coated cylindrical GRIN rod to form a GRIN lens element, wherein the central section has a front planar surface defined by said laser cleaving and the annular cladding has a curved annular front surface defined by said laser cleaving.

17. The method of claim 16, further comprising causing the cylindrical GRIN cane to have a polygonal cross-sectional shape so that the GRIN rod and GRIN lens element formed from the GRIN rod have a polygonal cross-sectional shape.

18. A GRIN lens assembly, comprising:
  a monolithic transparent medium;
  at least one GRIN lens central section supported in the monolithic transparent medium, the GRIN lens central section having an outer surface, a front end that is planar, and having a diameter $D_1$ in the range of 200 micrometers$\leq D_1 \leq$420 micrometers, where the central section index profile $n_A(r)$ is given by $n_A(r)=n_0(1-2\Delta(r/r_1)^\alpha)^{1/2}$, where $\Delta=(n_0^2-n_C^2)/2n_0^2$, where $\alpha$ is between 1.8 and 2.1, and $n_0$ and $n_C$ are constants; and
  an annular cladding that surrounds the outer surface of the central section of the GRIN lens and that has an annular front surface and a radial width $\delta r$ such that a surface curvature caused by a laser cleaving process resides substantially entirely on the annular front surface.

19. A gradient-index (GRIN) lens assembly, comprising:
  a cylindrical section having a polynomial or parabolic GRIN index profile $n_A(r)$, planar front and back surfaces, an outer surface, and a diameter $D_1$ in the range of 200 micrometers$\leq D_1 \leq$420 micrometers;
  an annular cladding of outer diameter $D_2$ surrounding the central section outer surface and having front and back annular surfaces and either a constant or a varying refractive index where the central section index profile $n_A(r)$ is given by $n_A(r)=n_0(1-2\Delta(r/r_1)^\alpha)^{1/2}$, where $\Delta=(n_0^2-n_C^2)/2n_0^2$, where $\alpha$ is between 1.8 and 2.1, and $n_0$ and $n_C$ are constants; and
  an optical fiber optically coupled to the central section at the planar back surface.

* * * * *